(12) United States Patent
Johnson et al.

(10) Patent No.: US 8,359,353 B2
(45) Date of Patent: Jan. 22, 2013

(54) SCHEDULING METHOD AND SYSTEM

(75) Inventors: Randy Scott Johnson, O Fallon, MO (US); Tedrick Neal Northway, Wood River, IL (US); William Alexander Smith, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 12/369,073

(22) Filed: Feb. 11, 2009

(65) Prior Publication Data
US 2010/0205605 A1  Aug. 12, 2010

(51) Int. Cl.
G06F 15/16 (2006.01)
(52) U.S. Cl. .................................. 709/204; 709/218
(58) Field of Classification Search .......... 709/201–205, 709/217–219
See application file for complete search history.

(56) References Cited

U.S. PATENT DOCUMENTS

| | | | |
|---|---|---|---|
| 7,310,676 B2 | 12/2007 | Bourne | |
| 2004/0203852 A1* | 10/2004 | Janakiraman | 455/456.1 |
| 2005/0084082 A1* | 4/2005 | Horvitz et al. | 379/114.06 |
| 2008/0010106 A1* | 1/2008 | Bourne et al. | 705/8 |
| 2008/0091504 A1* | 4/2008 | Lyle et al. | 705/9 |
| 2008/0098087 A1 | 4/2008 | Lubeck | |
| 2008/0098313 A1* | 4/2008 | Pollack | 715/753 |
| 2008/0255989 A1* | 10/2008 | Altberg et al. | 705/40 |
| 2009/0099924 A1* | 4/2009 | Lensch et al. | 705/14 |
| 2010/0058417 A1* | 3/2010 | Rondeau et al. | 725/110 |

OTHER PUBLICATIONS

Smith et al.; Eliciting Reactive and Reflective Feedback for a Social Communication Tool: A Multi-session Approach; DIS2004, Aug. 1-4, 2004, Cambridge, Massachusetts, USA; pp. 39-48.
Sciacchitano et al.; Intelligent Library Navigation using Location-aware Systems—The Newman Project; ACM SE'06, Mar. 10-12, 2006, Melbourne, Florida, USA; pp. 371-376.
Ng et al.; Whisper: Analysis and design for a community event service; CHI 2006, Apr. 22-27, 2006, Montreal, Quebec, Canada; pp. 1151-1156.

* cited by examiner

*Primary Examiner* — Yasin Barqadle
(74) *Attorney, Agent, or Firm* — Schmeiser, Olsen & Watts; Anna Linne

(57) ABSTRACT

A scheduling method and system. The method includes receiving by a computing system first data and second data associated with a user. The first data comprises user identification associated, an activity selection for an activity, and first scheduling information. The second data comprises geographical preference data. The computing system determines facilities associated with the activity. The facilities are located within boundaries specified by the geographical preference data. The computing system generates tentative reservations for the user at each facility. The computing system presents the tentative reservations data to the user. The computing system receives verification data from the user. The computing system posts the tentative reservations data in a social networking environment. The computing system stores the tentative reservations data.

16 Claims, 3 Drawing Sheets

SCHEDULING METHOD AND SYSTEM

FIELD OF THE INVENTION

The present invention relates to a method and associated system for scheduling activities between multiple parties.

BACKGROUND OF THE INVENTION

Determining specified time periods for performing user endeavors typically comprises a complicated and inefficient process with little flexibility. A first party requesting a specified time for performing a user endeavor may not receive input from a second party. Accordingly, there exists a need in the art to overcome at least some of the deficiencies and limitations described herein above.

SUMMARY OF THE INVENTION

The present invention provides a scheduling method comprising:

receiving, by a computing system from a first user, first data associated with said first user, wherein said first data comprises first user identification associated with said first user, an activity selection for an activity selected by said first user, and first scheduling information associated with said first user;

presenting, by said computing system to said first user in response to said receiving said first data, an input request form;

receiving, by said computing system from said first user in response to said input request form, second data associated with said first user and geographical preference data associated with said first user;

determining, by said computing system in response to said receiving said geographical preference data, facilities associated with said activity, wherein said facilities are located within boundaries specified by said geographical preference data;

generating, by said computing system based on said first data and said second data, tentative reservations data for said first user at each facility of said facilities, wherein each reservation of said tentative reservations data is associated with a different facility of said facilities, and wherein each said reservation is associated with a different time period;

presenting, by said computing system to said first user, said tentative reservations data;

receiving, by said computing system from said first user in response to said presenting said tentative reservations data, verification data indicating that said tentative reservations data is acceptable to said first user;

posting, by said computing system, said tentative reservations data in a social networking environment; and storing, by said computing system, said tentative reservations data.

The present invention provides a computing system comprising a processor coupled to a computer-readable memory unit, said memory unit comprising instructions that when executed by the processor implement a scheduling method, said method comprising:

receiving, by said computing system from a first user, first data associated with said first user, wherein said first data comprises first user identification associated with said first user, an activity selection for an activity selected by said first user, and first scheduling information associated with said first user;

presenting, by said computing system to said first user in response to said receiving said first data, an input request form;

receiving, by said computing system from said first user in response to said input request form, second data associated with said first user and geographical preference data associated with said first user;

determining, by said computing system in response to said receiving said geographical preference data, facilities associated with said activity, wherein said facilities are located within boundaries specified by said geographical preference data;

generating, by said computing system based on said first data and said second data, tentative reservations data for said first user at each facility of said facilities, wherein each reservation of said tentative reservations data is associated with a different facility of said facilities, and wherein each said reservation is associated with a different time period;

presenting, by said computing system to said first user, said tentative reservations data;

receiving, by said computing system from said first user in response to said presenting said tentative reservations data, verification data indicating that said tentative reservations data is acceptable to said first user;

posting, by said computing system, said tentative reservations data in a social networking environment; and storing, by said computing system, said tentative reservations data.

The present invention advantageously provides a simple method and associated system capable of determining specified time periods for performing user endeavors.

DETAILED DESCRIPTION OF THE INVENTION

Figure 1:
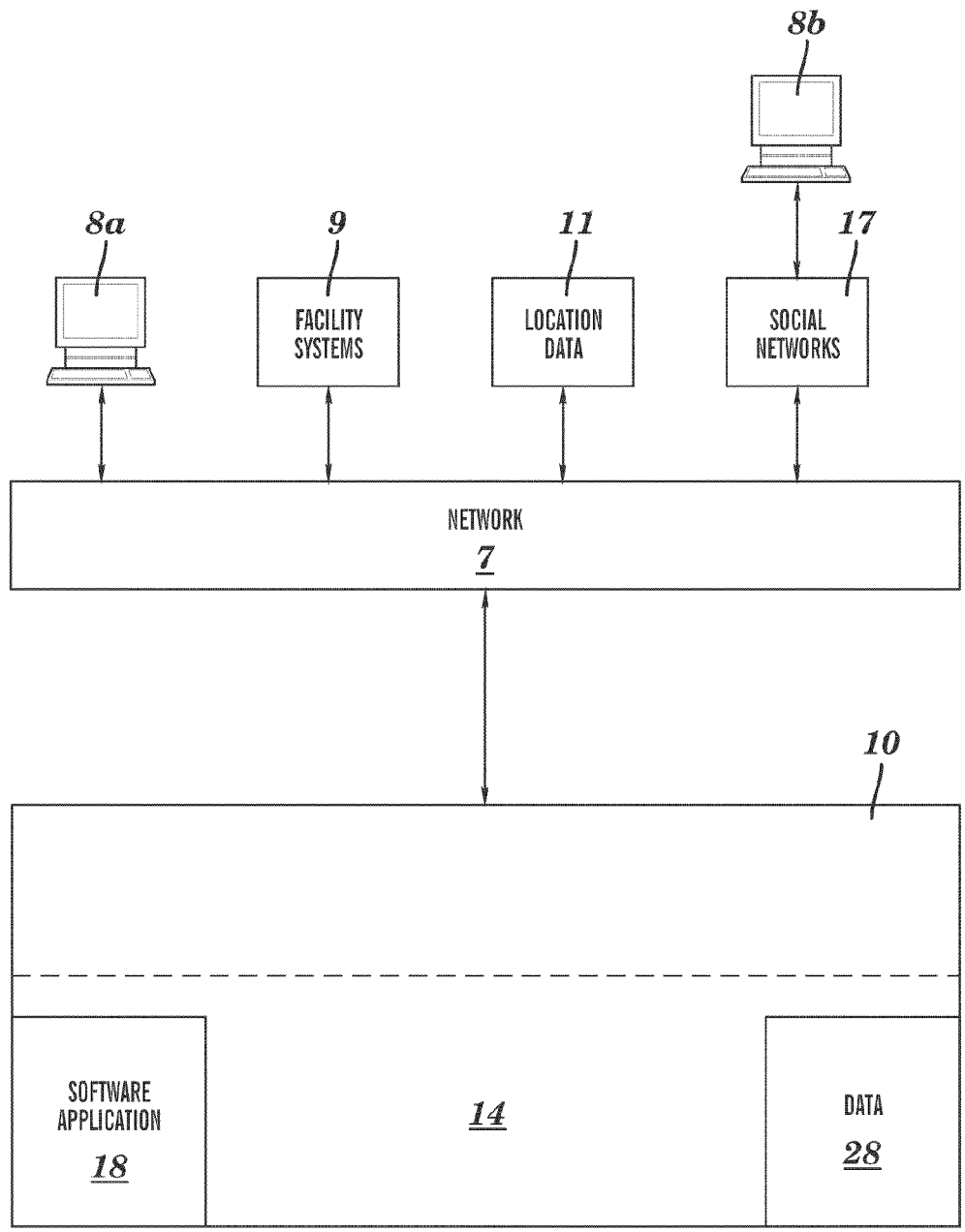
FIG. 1 illustrates a system for scheduling activities between multiple parties, in accordance with embodiments of the present invention.

FIG. 1 illustrates a system 2 for scheduling activities between multiple parties, in accordance with embodiments of the present invention. System 2 performs a social networking process for identifying and scheduling activities using activity profile-based invitations and a reservation system. System 2 leverages location based services to identify and schedule activities between multiple parties at a mutually agreeable location or facility. System 2 provides a tool (i.e., software application 18) and methodology to allow multiple partners interested in a same activity to identify an appropriate facility equidistant to all, determine an availability of the facility, and coordinate scheduling with all parties.

System 2 of FIG. 1 comprises an input/output (I/O) device(s) 8a, facilities systems 9, location based services data systems 11, and social networks 17 connected to a computing system 10 through a network 7. Additionally, an I/O device(s) 8b may be connected to social networks 17. I/O device(s) 8a is used by a user(s) for identifying and tentatively scheduling activities (at one or more of facilities 8) for posting in a social networking environment (i.e., social networks 17). Facilities 8 comprise systems associated with various facilities or venues available for reservations for specified activities. Location based services data 11 comprises systems and data associated with geographical locations of the various facilities or venues. Social networks 17 comprise various networks (e.g., Websites) available to users for socializing and communicating. I/O device(s) 8b is used by users for communicating with social networks 17. Computing system 10 performs a coordination process for:

1. Retrieving data 28 from input/output (I/O) device(s) 8a, facilities systems 9, location based services data 11, and social networks 17.
2. Scheduling activities between multiple parties.

I/O device(s) 8a and 8b may comprise any type of I/O device such as, inter alia, a notebook computer, a desktop computer, a personal digital assistant (PDA), etc. Facilities systems 9, location based services data systems 11, and social networks 17 may comprise any type of computing systems including, inter alia, server computers, database computers, etc. Network 7 may comprise any type of network including, inter alia, a local area network, (LAN), a wide area network (WAN), the Internet, etc. Computing system 10 may comprise any type of computing system(s) including, inter alia, a personal computer (PC), a server computer, a database computer, etc. Computing system 10 comprises a memory system 14. Memory system 14 comprises software application 18 and data 28 retrieved from I/O device(s) 8a and 8b, facilities systems 9, location based services data systems 11, and social networks 17.

Software application 18 coordinates a process for scheduling activities between multiple parties using the following steps:

1. Computing system 10 receives (i.e., from a requesting user via I/O device 8a) first data associated with the requesting user. The first data comprises first user identification associated with the requesting user, activity selections for an activity(s) (e.g., gym time for a workout, a movie, dinner reservations, etc) selected by the requesting user, and first scheduling information associated with the requesting user (e.g., available dates and times).
2. Computing system 10 presents to the requesting user, an input request form.
3. Computing system 10 receives (i.e., from the requesting user via the input request form) second data associated with the requesting user and geographical preference data associated with the requesting user.
4. Computing system 10 determines facilities (i.e., from facilities systems 9) associated with the activity(s). The facilities are located within boundaries specified by the geographical preference data.
5. Computing system 10 generates (i.e., based on said first data and said second data) tentative reservations for the requesting user at each facility of the facilities. Each reservation of the tentative reservations is associated with a different facility of the facilities. Each reservation is associated with a different time period.
6. Computing system 10 presents (i.e., to the requesting user) the tentative reservations for approval.
7. Computing system receives (i.e., from the requesting user) verification indicating that the tentative reservations are acceptable to the requesting user.
8. Computing system 10 posts the tentative reservations in a social networking environment (e.g., via social networks 17).
9. Computing system 10 stores the tentative reservations data.
10. Computing system 10 may transmit (i.e., to users associated with the social networking environment) invitations inviting the users to view the tentative reservations data in the social networking environment.
11. Computing system 10 receives from a responding user (i.e., the responding user is a member of the social networking environment) an identification associated with the responding user.
12. Computing system 10 receives from the responding user one of the following responses:
    A. A selection for one of the tentative reservations.
    B. Data indicating that none of the tentative reservations are acceptable.
13. If computing system 10 receives (from the responding user) a selection for one of the tentative reservations:
    A. The selection is transmitted to the requesting user.
    B. Computing system 10 receives from the requesting user, data indicating an acceptance of the selection.
    C. Computing system 10 confirms the tentative reservation (i.e., making a reservation) associated with the selection.
    D. Computing system 10 cancels the additional tentative reservations.
    E. Computing system 10 transmits confirmation data associated with the reservation to the requesting user and the responding user.
14. If computing system 10 receives (from the responding user) data indicating that none of the tentative reservations are acceptable, the computing system 10 may generate alternative tentative reservations and request that the requesting user and the responding user agree on an alternative tentative reservation. Alternatively, computing system 10 may request that the requesting user and the responding user suggest alternative facilities and time periods for the activity.

The following description describes an example of implementation for performing the process of scheduling activities between multiple parties:

A requestor (a user) looking to play a sport at a given time documents parameters in software application 18. For example, the requester could rate his/her skill level at racquetball and request software application 18 to petition all racquetball courts within a certain geographical range and time in order to determine the availability of the racquetball courts. The requester may select one or more of the locations and request software application 18 to tentatively reserve the racquetball courts. Software application 18 would then post the locations, times, and the skill level of the requester. Software application 18 posts the data on social networks 17 in order to make the data available to any other player interested in playing at that time and facility. Responders using this aspect of the social networks 17 may use software application 18 to evaluate their skill level to the requester and select a location most convenient to them. Software application 18 would then flag the entry for potential confirmation. Software application 18 may then notify the requester who may review the data entered by the responder and finalize a reservation. Software application 18 may automatically confirm the facility for use and transmit confirmation of the reservation to the requester and the responder. Software application 18 removes/releases the tentative reservations from the other locations.

Figure 2:
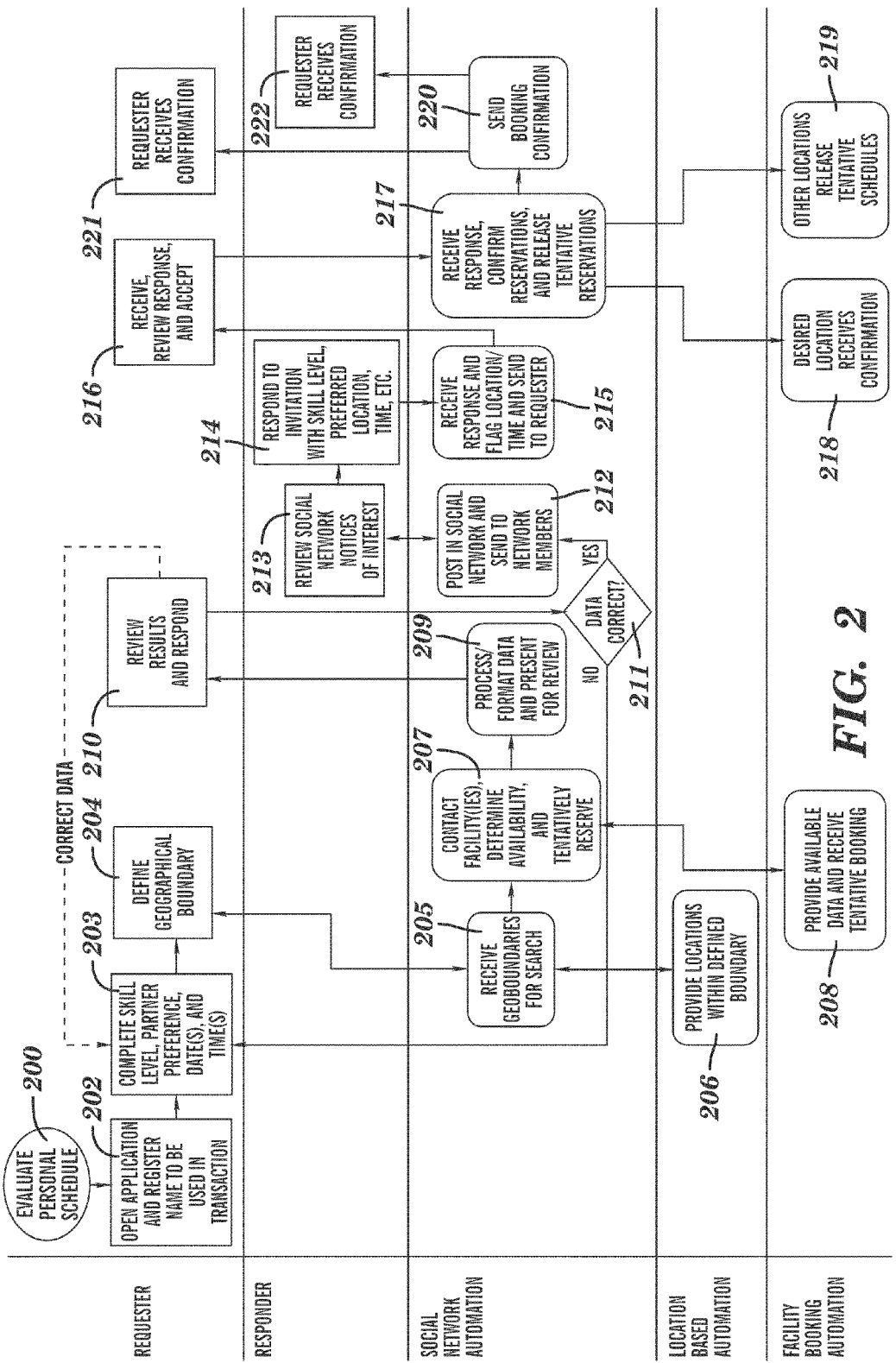
FIG. 2 illustrates a flowchart describing an algorithm used by the system of FIG. 1 for scheduling activities between multiple parties, in accordance with embodiments of the present invention.

FIG. 2 illustrates a flowchart describing an algorithm used by system 2 of FIG. 1 for scheduling activities between multiple parties, in accordance with embodiments of the present invention. In step 200, a requester evaluates his/her personal schedule for an activity. For example, the requester has determined that he/she would like to play racquetball and the requester evaluates his/her personal schedule to determine available dates and times. In step 202, a computing system (e.g., computing system 10 of FIG. 1) opens a software application (e.g., software application 18 of FIG. 1) and registers a name (i.e., for the requester) to be used in this transaction. The requester belongs to a social network and invokes the software application to enter the name to be used in the transaction. Note that the requester's name may comprise an alias. Additionally, detailed data is entered into the software application (e.g., male/female, charge/debit card data to be used for making reservations and holding the facility, etc). In step 203, the requester enters a skill level, partner preference, and date(s) and time(s) for the activity. The requester begins setting parameters for processing a request for facilities and partners for the activity. For example, the software application requests the requester's data to help with defining expectations of a responder. The data may comprise, inter alia:

1. A skill level of:
   A. Beginner
   B. Proficient
   C. Skilled
   D. A willingness to play responder at any level or a specific level
2. A partner preference of:
   A. Male
   B. Female
   C. No Preference
3. Time and date Information:
   A. Specify time ranges requester is available (e.g., between the hours of 08:00 AM-12:00 PM).
   B Specify dates (e.g., Tuesday June $10^{th}$ and Thursday June $12^{th}$).
   C. Specify a specific day and time (e.g., Monday June $6^{th}$ between 18:00 and 20:00).

In step 204, the requester defines geographical boundaries for executing the activity. The requester inputs a current location and specifies a geographical area for the software application to investigate (i.e., for desired facilities). In step 205, the software application receives geographical boundaries defined in step 204. The software application receives the requester's location and the geographical area to be searched. The software application communicates with a location based tool to obtain facility locations within the geographical area specified. In step 206, the location based tool provides locations for facilities within defined boundaries. The location based tool receives the request for information and gathers the data as requested and returns the results to the software application. In step 207, the software application (i.e., using the data from step 206) transmits a request to all facilities which have Web portals to determine if facilities are available at the times and dates submitted. The request includes data from all facilities which match any combination of the defined conditions. In step 208, the software application generates tentative reservations at the facilities. All matching times, dates, or combinations for each facility mark the associated facility as tentatively reserved and the facilities are held with credit card data. In step 209, the software application formats the tentative reservations and presents the tentative reservations to the requester for review. The software application organizes the tentative reservations into a logical format for requester review. For example:

1. Location A data confirmed reservation on June $10^{th}$ from 09:00-11:00.
2. Location B data confirmed reservation on June $6^{th}$ from 19:00-20:00.
3. Location C data confirmed reservation June $10^{th}$ from 08:00-12:00.
4. Location D data confirmed reservation June $12^{th}$ from 09:30-11:30.

In step 210, the requester reviews the tentative reservations. The requester reviews and validates the tentative reservations. In step 211, it is determined (i.e., based on requester response) if the tentative reservations are acceptable. The software application receives input from the requester as to the accuracy of the information gathered and presented. If in step 211, it is determined that the tentative reservations are not acceptable then step 203 is repeated (i.e., to clear date and time data and receive a desired date and time). If in step 211, it is determined that the tentative reservations are acceptable then in step 212, the tentative reservations are posted in a social networking environment (e.g., via social networks 17 in FIG. 1). A general invitation is posted in the social networking environment for members to review. If a member has set their profile for this type of notice, the software application transmits a flagged notice to that member. In step 213, a responder (i.e., a member of the social networking environment) reviews a social network notice of interests (i.e., comprising the tentative reservations). The responder may set an alert for notices from other members who share common interests. In this embodiment, the responder reviews the notices from the requester asking for play time at the dates, times, and locations captured and validated in steps 209 and 210. In step 214, the responder responds to the invitation with a skill level, preferred location, time, etc. The responder enters the required/preferred data into the software application. In step 215, the software application receives the input from the responder and flags the location, time, and date in preparation for a final action by the requester. A notice is transmitted to the requester. In step 216, the requester receives the response from the responder, reviews the data, and transmits his/her acceptance. In step 217, the software application receives the response, confirms the reservations, and releases the tentative reservations. In step 218, the reserved facility confirms the reservation for the identified time and date. In step 219, the additional facilities release the tentative reservations. In step 220, the software application transmits confirmation to both the requester and responder that the reservations have been confirmed for use. In step 221, the requester receives the confirmation notice with the location, times, and dates booked. In step 222, the responder receives the confirmation notice with the location, times, and dates booked.

Figure 3:
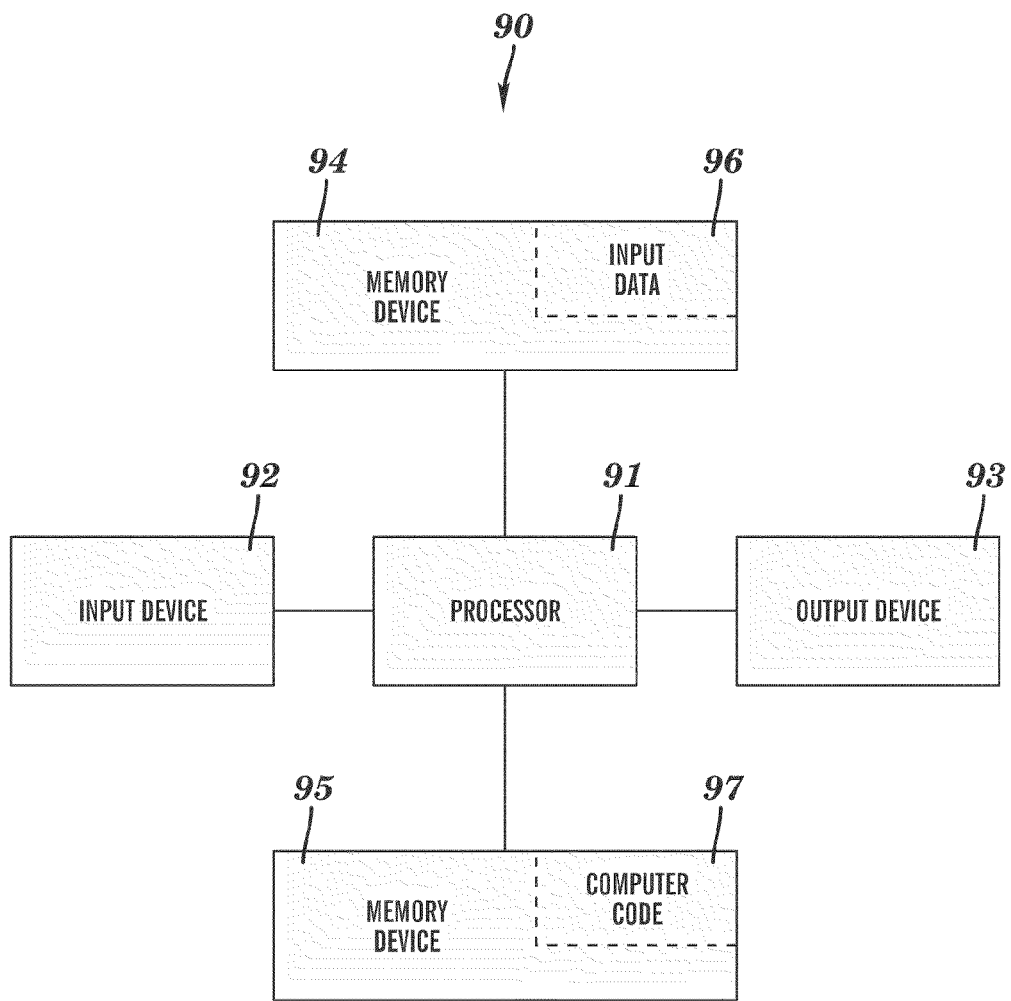
FIG. 3 illustrates a computer apparatus used for scheduling activities between multiple parties, in accordance with embodiments of the present invention.

FIG. 3 illustrates a computer apparatus 90 (e.g., computing system 10 of FIG. 1) used for scheduling activities between multiple parties, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for scheduling activities between multiple parties. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to schedule activities between multiple parties. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for scheduling activities between multiple parties. In another embodiment, the invention provides a business method that performs the process steps of the invention on a subscription, advertising, and/or fee basis. That is, a service provider, such as a Solution Integrator, could offer to schedule activities between multiple parties. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A scheduling method comprising:
receiving, by a computing system from a first user, first data associated with said first user, wherein said first data comprises first user identification associated with said first user, an activity selection for an activity selected by said first user, first scheduling information associated with said first user, preferred skill levels associated with said first user and said activities, and a partner preference type, said partner preference type comprising a male or a female;
presenting, by said computing system to said first user in response to said receiving said first data, an input request form;
receiving, by said computing system from said first user in response to said input request form, second data associated with said first user and geographical preference data associated with said first user;
determining, by said computing system in response to said receiving said geographical preference data, facilities associated with said activity, wherein said facilities are located within boundaries specified by said geographical preference data;
contacting, by said computing system said facilities to determine availability during specified time periods disclosed in said first scheduling information;
generating, by said computing system based on results of said contacting, said first data, and said second data, tentative reservations data for said first user at each facility of said facilities, wherein each reservation of said tentative reservations data is associated with a different facility of said facilities, and wherein each said reservation is associated with a different time period of said specified time periods;
presenting, by said computing system to said first user, said tentative reservations data;
receiving, by said computing system from said first user in response to said presenting said tentative reservations data, verification data indicating that said tentative reservations data is acceptable to said first user;
posting, by said computing system, said tentative reservations data in a social networking environment;
storing, by said computing system, said tentative reservations data;
transmitting, by said computing system to users associated with said social networking environment, invitation data inviting said users to view said tentative reservations data in said social networking environment;
receiving, by said computing system from a social networking user of said users associated with said social networking environment in response to said transmitting, a first skill level of said preferred skill levels, a preferred location associated with said facilities, and a preferred time period of said specified time periods;
generating, by said computing system, an alert associated with notices from a group of users of said users that share common interests with said social networking user;
flagging, by said computing system, said first skill level, said preferred location, and said preferred time period;
selecting, by said computing system based on said flagging and a response to said alert, a reservation of said tentative reservations data, said reservation associated with a specific facility of said facilities;
confirming, by said computing system based on responses from said first user and said social networking user, said reservation;
releasing, by said computing system in response to said confirming, reservations of said tentative reservations data; and
modifying, by said computing system in response to said releasing, tentative schedules associated with said facilities.

2. The method of claim 1, further comprising:
receiving, by said computing system from a second user in response to said posting, second user identification associated with said second user and a first selection for a first reservation of said tentative reservations data;
transmitting, by said computing system to said first user, said second user identification and said first selection; and
receiving, by said computing system from said first user, first response data associated with said first selection.

3. The method of claim 2, wherein said first response data comprises acceptance data indicating that said first user has accepted said first selection, and wherein said method further comprises:
confirming, by said computing system, said first reservation;
canceling, by said computing system, all additional reservations of said tentative reservations data;

transmitting, by said computing system to said first user, confirmation data confirming said first reservation; and transmitting, by said computing system to said second user, said confirmation data.

4. The method of claim 2, wherein said first response data comprises results data indicating that said first user has not accepted said first selection, and wherein said method further comprises:

transmitting, by said computing system to said second user, said results data;

receiving, by said computing system from said second user in response to said results data, a second selection for a second reservation of said tentative reservations data;

transmitting, by said computing system to said first user, said second selection; and receiving, by said computing system from said first user, second response data associated with said second selection.

5. The method of claim 1, further comprising:

before said presenting said tentative reservations data to said first user, formatting by said computing system, said tentative reservations data into a readable format.

6. The method of claim 1, wherein said social networking environment comprises a social networking Website.

7. The method of claim 1, further comprising:

receiving, by said computing system from a second user in response to said posting, second user identification associated with said second user and a reply data indicating that said tentative reservations data does not comprise any acceptable reservations;

transmitting, by said computing system to said first user, said second user identification and said reply data;

receiving, by said computing system from said first user in response to said reply data, a plurality of alternative dates and times for said facilities associated with said activity;

transmitting, by said computing system to said second user, said alternative dates and times;

receiving, by said computing system from said second user, a first selection for a first date and time associated with a first facility of said facilities;

transmitting, by said computing system to said first user, said first selection;

receiving, by said computing system from said first user, acceptance data indicating that said first selection is acceptable;

generating, by said computing system, a first reservation for said first date and time at said first facility, wherein said first reservation is for said first user and said second user;

transmitting, by said computing system to said first user and said second user, notification data indicating said first reservation.

8. A process for supporting computer infrastructure, said process comprising providing at least one support service for at least one of creating, integrating, hosting, maintaining, and deploying computer-readable code in a computing system, wherein the code in combination with said computing system performs the method of claim 1.

9. A computer program product, comprising a tangible computer readable storage device storing a computer readable program code, said computer readable program code configured to perform the method of claim 1 upon being executed by a processor of said computing system.

10. A computing system comprising a processor coupled to a computer-readable memory unit, said memory unit comprising instructions that when executed by the processor implement a scheduling method, said method comprising:

receiving, by said computing system from a first user, first data associated with said first user, wherein said first data comprises first user identification associated with said first user, an activity selection for an activity selected by said first user, first scheduling information associated with said first user, preferred skill levels associated with said first user and said activities, and a partner preference type, said partner preference type comprising a male or a female;

presenting, by said computing system to said first user in response to said receiving said first data, an input request form;

receiving, by said computing system from said first user in response to said input request form, second data associated with said first user and geographical preference data associated with said first user;

determining, by said computing system in response to said receiving said geographical preference data, facilities associated with said activity, wherein said facilities are located within boundaries specified by said geographical preference data;

contacting, by said computing system said facilities to determine availability during specified time periods disclosed in said first scheduling information;

generating, by said computing system based on results of said contacting, said first data, and said second data, tentative reservations data for said first user at each facility of said facilities, wherein each reservation of said tentative reservations data is associated with a different facility of said facilities, and wherein each said reservation is associated with a different time period of said specified time periods;

presenting, by said computing system to said first user, said tentative reservations data;

receiving, by said computing system from said first user in response to said presenting said tentative reservations data, verification data indicating that said tentative reservations data is acceptable to said first user;

posting, by said computing system, said tentative reservations data in a social networking environment;

storing, by said computing system, said tentative reservations data;

transmitting, by said computing system to users associated with said social networking environment, invitation data inviting said users to view said tentative reservations data in said social networking environment;

receiving, by said computing system from a social networking user of said users associated with said social networking environment in response to said transmitting, a first skill level of said preferred skill levels, a preferred location associated with said facilities, and a preferred time period of said specified time periods;

generating, by said computing system, an alert associated with notices from a group of users of said users that share common interests with said social networking user;

flagging, by said computing system, said first skill level, said preferred location, and said preferred time period;

selecting, by said computing system based on said flagging and a response to said alert, a reservation of said tentative reservations data, said reservation associated with a specific facility of said facilities;

confirming, by said computing system based on responses from said first user and said social networking user, said reservation;

releasing, by said computing system in response to said confirming, reservations of said tentative reservations data; and modifying, by said computing system in response to said releasing, tentative schedules associated with said facilities.

11. The computing system of claim 10, wherein said method further comprises:

receiving, by said computing system from a second user in response to said posting, second user identification associated with said second user and a first selection for a first reservation of said tentative reservations data;

transmitting, by said computing system to said first user, said second user identification and said first selection; and receiving, by said computing system from said first user, first response data associated with said first selection.

12. The computing system of claim 11, wherein said first response data comprises acceptance data indicating that said first user has accepted said first selection, and wherein said method further comprises:

confirming, by said computing system, said first reservation;

canceling, by said computing system, all additional reservations of said tentative reservations data;

transmitting, by said computing system to said first user, confirmation data confirming said first reservation; and transmitting, by said computing system to said second user, said confirmation data.

13. The computing system of claim 11, wherein said first response data comprises results data indicating that said first user has not accepted said first selection, and wherein said method further comprises:

transmitting, by said computing system to said second user, said results data;

receiving, by said computing system from said second user in response to said results data, a second selection for a second reservation of said tentative reservations data;

transmitting, by said computing system to said first user, said second selection; and receiving, by said computing system from said first user, second response data associated with said second selection.

14. The computing system of claim 10, wherein said method further comprises:

before said presenting said tentative reservations data to said first user, formatting by said computing system, said tentative reservations data into a readable format.

15. The computing system of claim 10, wherein said social networking environment comprises a social networking Website.

16. The computing system of claim 10, wherein said method further comprises:

receiving, by said computing system from a second user in response to said posting, second user identification associated with said second user and a reply data indicating that said tentative reservations data does not comprise any acceptable reservations;

transmitting, by said computing system to said first user, said second user identification and said reply data;

receiving, by said computing system from said first user in response to said reply data, a plurality of alternative dates and times for said facilities associated with said activity;

transmitting, by said computing system to said second user, said alternative dates and times;

receiving, by said computing system from said second user, a first selection for a first date and time associated with a first facility of said facilities;

transmitting, by said computing system to said first user, said first selection;

receiving, by said computing system from said first user, acceptance data indicating that said first selection is acceptable;

generating, by said computing system, a first reservation for said first date and time at said first facility, wherein said first reservation is for said first user and said second user;

transmitting, by said computing system to said first user and said second user, notification data indicating said first reservation.

* * * * *